Aug. 15, 1967  R. J. PETERMAN ET AL  3,335,594
CRIMPING APPARATUS
Filed March 25, 1965  2 Sheets-Sheet 1

Inventors:-
Robert J. Peterman,
Dale H. Leiker, Jr.,
By Hofgren, Wegner, Allen,
Stellman & McCord, Attys.

Aug. 15, 1967  R. J. PETERMAN ET AL  3,335,594
CRIMPING APPARATUS
Filed March 25, 1965  2 Sheets-Sheet 2
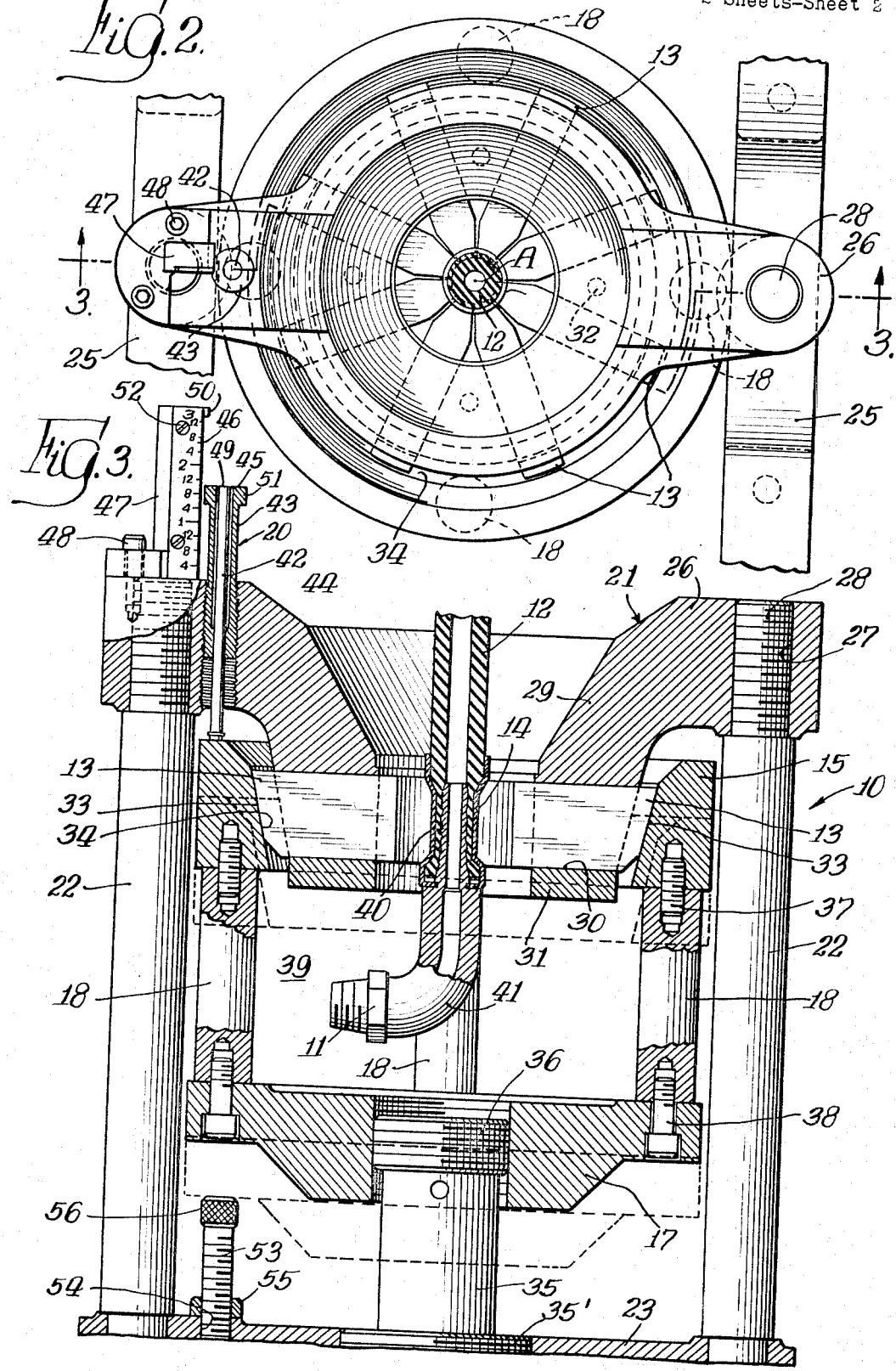

United States Patent Office 3,335,594
Patented Aug. 15, 1967

3,335,594
CRIMPING APPARATUS
Robert J. Peterman and Dale H. Leiker, Jr., Manitowoc, Wis., assignors to Imperial-Eastman Corporation, a corporation of Illinois
Filed Mar. 25, 1965, Ser. No. 442,619
8 Claims. (Cl. 72—308)

ABSTRACT OF THE DISCLOSURE

An apparatus for crimping a fitting to a hose wherein a pressure ring is engaged with a plurality of crimping dies to effect the crimping of the fitting onto the hose. A base plate is spaced from the pressure ring by a plurality of circumferentially spaced posts to define a space permitting a portion of the fitting to be freely received therein during the crimping operation. The spacing of the posts permits the space to open outwardly at a plurality of positions spaced equiangularly fully about the axis.

---

This invention relates to apparatus for applying fittings to the end of tubular elements such as hose, and in particular to apparatus for crimpedly securing a fitting to a hose end.

In one well known form of hose construction, a fitting is crimpedly secured to one end of the hose. For this purpose, the fitting is provided with a ferrule portion adapted to be constricted radially inwardly by the forceful engagement of a plurality of dies therewith. Apparatus heretofore provided for effecting the desired radially inward movement of such dies to effect such crimping has had the serious disadvantages of limited ability to provide for such crimped connection to the hose of fittings such as elbow fittings and the like requiring a substantial free space adjacent the hose end to accommodate the fitting during the crimping operation.

It is, therefore, a principal object of the present invention to provide a new and improved apparatus for crimpedly securing a fitting to a hose end.

Another object of the invention is to provide such apparatus having a new and improved construction providing for the securing to the hose end of fittings requiring a substantial space beyond the hose end, such as elbows and the like.

A further object of the invention is the provision of such apparatus including a plurality of crimping dies, means for holding the dies in coaxial, circumferentially spaced relationship, and means for forcing the dies radially inwardly to crimp a crimpable fitting onto the hose end, the forcing means including pressure means, a base plate, means spacing the pressure means coaxially from the base plate to define a space therebetween, means for forcibly urging the forcing means coaxially toward the dies, and means on the dies and the pressure means for forcibly urging the dies radially inwardly as an incident of movement of the forcing means theretoward, the space between the base plate and pressure means being arranged to receive a portion of the fitting freely therein during the crimping of the fitting onto the hose end.

Still another object of the invention is the provision of such apparatus having new and improved means for limiting the retraction of the forcing means relative to the crimping dies.

A yet further object of the invention is the provision of such apparatus wherein the limiting means is adjustable.

A further object of the invention is the provision of such apparatus wherein the limiting means may be selectively disposed to permit a full retraction of the forcing means, thereby allowing installation and removal of the crimping dies in the apparatus as desired.

Another object of the invention is the provision of such apparatus having gauge means arranged to indicate a maximum travel of the forcing means wherein the base plate is maintained spaced from the fitting in said space.

Other objects and advantages of the invention will be apparent from the following description taken in connection with the accompanying drawings wherein:

FIGURE 2 is a top plan view thereof; and

FIGURE 3 is a fragmentary enlarged vertical section thereof taken substantially along the line 3—3 of FIGURE 2, with portions thereof shown in elevation for facilitating the illustration thereof.

Figure 1:
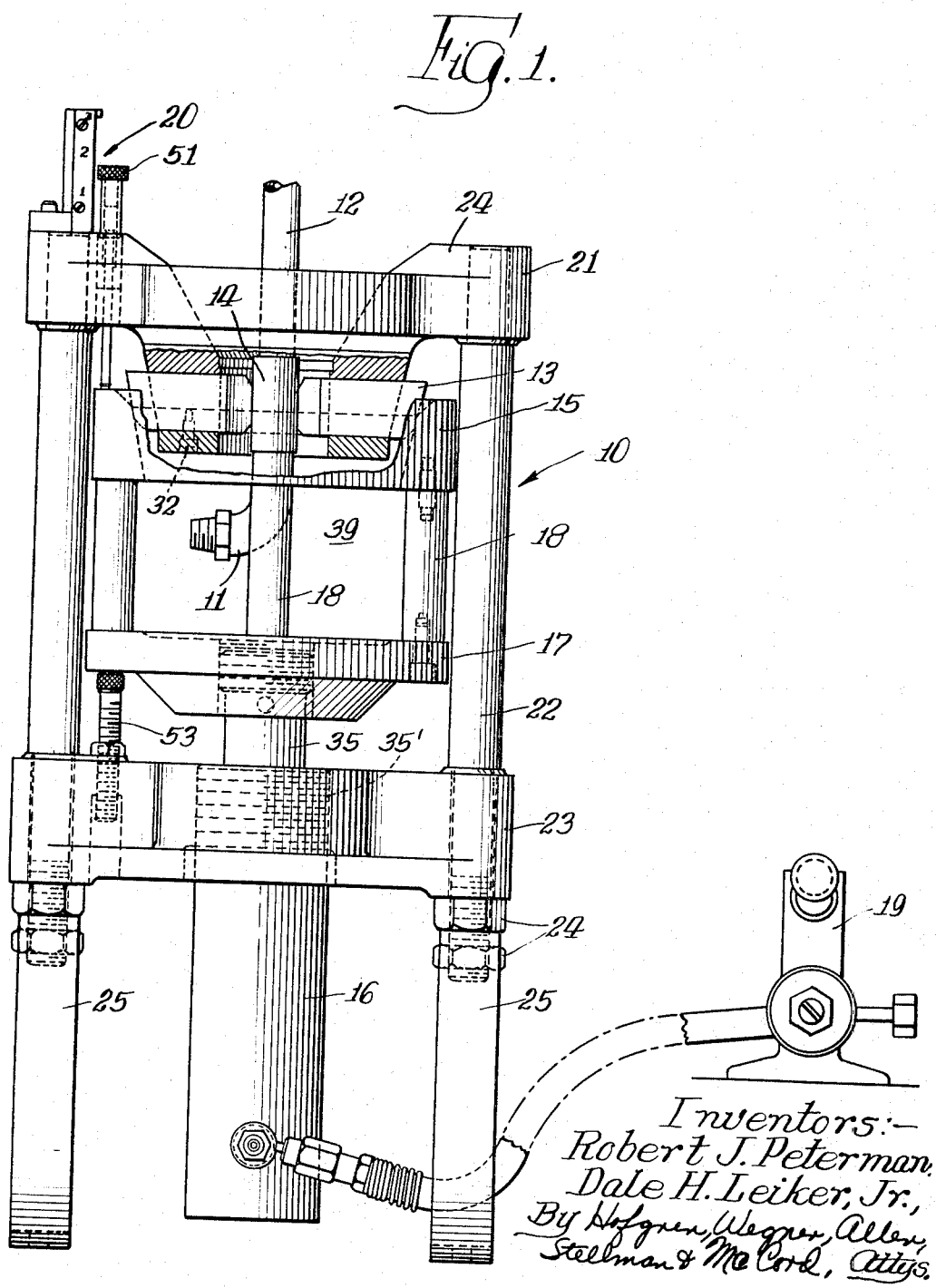
FIGURE 1 is a front elevation of a crimping apparatus embodying the invention with a hose end mounted therein for crimped attachment thereto of a fitting.

In the exemplary embodiment of the invention as disclosed in the drawing, a crimping apparatus generally designated 10 is shown to comprise an apparatus arranged for crimpedly applying a fitting such as elbow 11 to a hose end 12. The crimping is effected in apparatus 10 by means of a plurality of crimping dies 13 arranged coaxially in circumferentially spaced association (as best seen in FIGURE 2) about a central axis A. The dies are forced radially inwardly by means of a pressure ring 15 to have crimping association with a crimpable ferrule portion 14 of the fitting 11. The pressure ring is moved axially relative to the dies by a suitable force applying means such as a hydraulic ram 16 acting through a base plate 17 and interconnecting spacers 18. The ram is selectively operated by a conventional pump control means 19 for selective upward movement of the pressure ring 15 to effect the desired crimping and release movement of the dies 13. The movement of the base plate 17 and dies 13 is indicated to the operator by a gauge 20 carried severally on a die support member 21 in the upper portion of the apparatus and on the pressure ring 15.

Referring now more specifically to FIGURES 2 and 3, the apparatus 10 includes a pair of upright posts 22 secured to a cross member 23 by a suitable means such as nuts 24 and carrying the die support member 21 on their upper ends. A pair of U-shaped legs 25 are secured to the lower end of the posts 22. The die support member 21 includes opposite upper leg portions 26 having a threaded bore 27 threadedly receiving the upper end 28 of the posts 22. The support member 21 further includes a downturned annular mid-portion 29 having a plurality of slots 30 in which the crimping dies 13 are radially slidably retained, the lower end of the slots 30 being closed by an annular cover 31 secured to the supply member portion 29 by suitable means, such as screws 32.

As shown in FIGURE 3, the outer face 33 of each die 13 is inclined slightly to the vertical. The pressure ring 15 is provided with an annular inner face 34 which is inclined similarly to the vertical so as to be engageable with the die surfaces 33 and force the dies radially inwardly as an incident of axial movement of the pressure ring upwardly, as shown in FIGURE 3, toward the die members. The upward movement of the pressure ring, as discussed briefly above, is effected by the hydraulic ram 16 which, as shown in FIGURE 3, includes a piston portion 35 having an upper end 36 threadedly secured to the base plate 17 and a cylinder portion 35' threadedly secured to the cross member 23. The spacers 18 comprise cylindrical members having their upper ends secured to the pressure ring 15 by suitable means such as double threaded screws 37 and their lower ends secured to the base plate 17 by suitable means such as screws 38. Thus, the spacers 18 maintain the pressure ring 15 spaced from the base plate 17 a preselected distance to define therebetween an open space 39 in which the lower end of the fitting 11 is freely accommodated.

As shown in FIGURE 3, the ferrule portion 14 of fitting 11 is crimped onto the hose end 12 by the dies 13 so as to be tightly constricted about an insert portion 40 of the fitting disposed within the hose end. The fitting may further include an elbow portion 41 accommodated in space 39 as discussed above. The elbow fitting 11 is illustratively only, it being understood that apparatus 10 is adapted for connecting other fittings requiring a free space such as space 39 at the lower end of the hose during the crimping operation.

To assure a proper crimping of the ferrule portion 14 onto the hose end 12, the amount of radial movement of the dies 13 is controlled by the gauge 20. More specifically, the gauge includes a gauging rod 42 fixedly secured to the pressure ring 15 to upstand therefrom into a tubular member 43 which is adjustably threaded into a threaded bore 44 in the end portion 26 of the die support member 21. The position of the upper end surface 45 of the tubular member 43 is accurately correlated with a scale 46 carried on an upright support 47 secured to the die supply member portion 26 by suitable means such as screw 48. Thus, when the pressure ring 15 is moved upwardly by the hydraulic ram portion 35, the rod 42 moves correspondingly therewith until the upper end 49 of the rod is flush with the upper surface 45 of the tubular member 43. At this time, the operator operates the pump 19 to discontinue further upward movement of the pressure ring and reverses the operation of the ram to lower the pressure ring suitably to permit retraction of the dies 13 and removal of the hose end 12 and the fitting 11 now crimpedly secured thereto from the apparatus 10.

The support 47 is further provided with a stop 50 overlying the surface 45 so as to limit the upward adjustment of the tubular member to a preselected maximum. Thus, stop 50 provides a means for limiting the upward movement of the base plate 17 to preclude contact thereof with the fitting 11, as well as limiting the crimping die movement to a minimum inner disposition, thereby effectively precluding damage to the dies by an excessive inward movement thereof. Further, the stop 50 effectively precludes complete removal of the adjustable element 43 from the die support member effectively precluding loss of the element.

Thus, apparatus 10 provides an extremely simple and economical crimping of the fitting 11 onto the hose end 12. More specifically, firstly the fitting is arranged with the insert portion 40 within the hose end 12 and with the undeformed ferrule 14 disposed about the exterior of the hose end. The hose end is then disposed in coaxial alignment with the flange 29 of the die support member 21 and the pressure ring 15 and in radial alignment with the crimping dies 13, as shown in FIGURE 1. In this disposition, the fitting 11 extends to within space 39 wherein it is freely accommodated. The pressure ring 15 is then moved upwardly by suitable manipulation of the pump 19 to operate the hydraulic ram 16 in an upward direction. The base plate 17 is spaced sufficiently below the pressure ring 15 to preclude interference between the base plate and the fitting 11 in the upper most position of the base plate, as shown in FIGURE 3.

The inward movement of the crimping dies causes the ferrule to be crimped inwardly in the manner shown in FIGURE 3, thereby clamping the hose end positively between the insert 40 and the ferrule 14 to provide a sealed connection of the fitting 11 to the hose end 12. The disposition of the crimping dies 13 in the fully crimping position of FIGURE 3 is indicated to the operator by the movement of the rod 42 to the position wherein its upper end 49 is flush with the upper surface 45 of the tubular member 43. Apparatus 10 is adapted for use with hoses of different diameters and, therefore, requiring different amounts of inward movement of the crimping dies 13 in the crimping operation. The position of the upper surface 45 of the tubular member is suitably adjusted by reference to the scale 46 to be proper for the specific hose and fitting combination being assembled. To facilitate adjustment, the upper portion 51 of the tubular member is suitably enlarged and exteriorly knurled. The scale 46 may be removably secured to the support 47 by suitable means such as screws 52 so that different scales may be provided thereon as desired.

Upon completion of the crimped connection of the fitting 11 to the hose end 12, the ram 16 is lowered as by release of the pressure in cylinder 35' permitting the pressure ring 15 to drop downwardly from the dies 13 and permitting the dies to be moved radially outwardly away from the fitting to permit the fitting on the hose end to be moved upwardly between and withdrawn from the apparatus. The downward retraction of the piston 35 is limited by the engagement of the base plate 17 with a threaded stop 53 carried on the cross member 23. The stop is threaded into a suitable threaded opening 54 in the cross member and is locked in its adjusted position by suitable means such as nut 55. The upper end of the stop 53 may be provided with a knurled enlargement 56 for facilitated adjustment of the stop.

Should it be desired at any time to remove the crimping dies 13 as for replacement or substitution, the nut 55 is suitably manipulated to permit a threaded downward adjustment of stop 53 sufficiently to permit the base plate 17 to move downwardly below the position shown in FIGURE 1 to the point where the pressure ring 15 is below the crimping dies, whereupon the crimping dies may be withdrawn radially outwardly from the slots 30. Upon replacement or substitution of the crimping dies, the stop 53 is then repositioned as desired for subsequent control of the downward movement of the base plate 17 as discussed above.

While we have shown and described one embodiment of our invention, it is to be understood that it is capable of many modifications. Changes, therefore, in the construction and arrangement may be made without departing from the spirit and scope of the invention as defined in the appended claims.

We claim:
1. Apparatus for crimpedly applying a fitting to a hose end, comprising:
   a plurality of crimping dies;
   means for holding said dies in coaxial, circumferentially spaced relationship; and
   means for forcing said dies radially inwardly to crimp a crimpable fitting onto said hose end, said forcing means including a pressure ring, a base plate, means maintaining a preselected coaxial spacing between said pressure ring and said base plate to define a space therebetween and open to radially outwardly thereof at positions spaced equiangularly fully about the axis of said dies and pressure ring;
   means for forcibly urging said pressure ring coaxially toward said dies, and means on said dies and said pressure ring for forcibly urging said dies radially inwardly as an incident of movement of said forcing means theretoward, said space between said base plate and pressure ring being arranged to receive a portion of the fitting freely therein during the crimping of the fitting onto the hose end.

2. The apparatus of claim 1 wherein said means maintaining said spacing between the pressure ring and the base plate comprises a plurality of circumferentially spaced posts extending parallel to the axis of the pressure ring radially outwardly thereof.

3. The apparatus of claim 1 further including means for limiting the retraction of the pressure ring in the direction of movement away from said dies to maintain at least a portion of the pressure ring radially outwardly of the crimping dies in the retracted position thereof.

4. The apparatus of claim 3 including means for adjustably positioning said retraction limiting means.

5. The apparatus of claim 3 including means permitting selective adjustment of the retraction limiting means to permit the pressure ring to be retracted sufficiently to allow withdrawal of the crimping dies from the apparatus when desired.

6. The apparatus of claim 1 further including gauge means for indicating any one of a plurality of preselected crimping dispositions of said dies and precluding a movement of said base plate toward said dies sufficiently to engage the fitting in said space.

7. The apparatus of claim 6 including means providing facilitated adjustment of said gauge means.

8. The apparatus of claim 6 including means providing facilitated adjustment of said gauge means and stop means effectively limiting the adjustment to a preselected maximum adjustment.

References Cited

UNITED STATES PATENTS

| | | | |
|---|---|---|---|
| 1,552,162 | 9/1925 | Huff | 72—402 |
| 2,291,803 | 8/1942 | Grotnes | 72—402 X |
| 2,302,674 | 11/1942 | Carter | 72—402 |
| 2,311,663 | 2/1943 | Hunziker | 29—508 |
| 2,377,829 | 6/1945 | Vaill | 29—237 |
| 2,978,263 | 4/1961 | Walsh et al. | 29—508 X |
| 3,047,043 | 7/1962 | Albrecht | 29—237 |
| 3,096,876 | 7/1963 | Scudieri | 29—408 X |
| 3,159,197 | 12/1964 | Anderson et al. | 72—402 |

FOREIGN PATENTS

| | | |
|---|---|---|
| 962,094 | 6/1964 | Great Britain. |

RICHARD J. HERBST, *Primary Examiner.*

E. SUTTON, *Assistant Examiner.*